United States Patent
Kei et al.

(10) Patent No.: US 12,259,641 B2
(45) Date of Patent: Mar. 25, 2025

(54) WATERPROOF CAMERA SYSTEM

(71) Applicant: CANON KABUSHIKI KAISHA, Tokyo (JP)

(72) Inventors: Hidetoshi Kei, Tokyo (JP); Masayoshi Shibata, Kanagawa (JP); Takashi Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 18/164,771

(22) Filed: Feb. 6, 2023

(65) Prior Publication Data
US 2023/0266641 A1    Aug. 24, 2023

(30) Foreign Application Priority Data

Feb. 18, 2022  (JP) .................................. 2022-023859

(51) Int. Cl.
*H04N 23/51* (2023.01)
*G03B 17/08* (2021.01)

(52) U.S. Cl.
CPC ............ *G03B 17/08* (2013.01); *H04N 23/51* (2023.01)

(58) Field of Classification Search
CPC ........ H04N 23/50; H04N 23/51; G03B 17/08; G03B 17/02
USPC .......................................................... 348/81
See application file for complete search history.

(56) References Cited

U.S. PATENT DOCUMENTS

| 9,352,236 | B1* | 5/2016 | Fernandez | A63H 23/14 |
| 2004/0208499 | A1* | 10/2004 | Grober | F16M 11/18 |
| | | | | 396/428 |
| 2016/0026071 | A1* | 1/2016 | Kanai | H01Q 1/34 |
| | | | | 396/25 |
| 2019/0108745 | A1* | 4/2019 | Tepper | E04H 4/06 |

FOREIGN PATENT DOCUMENTS

JP    6478211 B2    3/2019

OTHER PUBLICATIONS

Hosotani, "Simple underwater monitoring of shallow water using a spherical camera mounted on a radio-controlled boat" (Year: 2016).*

* cited by examiner

*Primary Examiner* — Eileen M Adams
(74) *Attorney, Agent, or Firm* — Canon U.S.A., Inc. IP Division

(57) ABSTRACT

A waterproof camera system that maintains a wireless connection state with an external device while floating on a water surface includes an image pickup apparatus equipped with a wireless module, a waterproof casing that hermetically stores the image pickup apparatus, and a float attached to the waterproof casing. An antenna unit of the wireless module is arranged at either a position with a height approximately equal to a water surface or a position separated from the water surface in an above water direction in each of a first position where the waterproof camera system floats on the water surface so that the image pickup apparatus can perform underwater image pickup and a second position where the waterproof camera system floats on the water surface so that the image pickup apparatus can perform above water image pickup.

8 Claims, 6 Drawing Sheets

200

200

WATERPROOF CAMERA SYSTEM

BACKGROUND

Field of the Disclosure

The present disclosure relates to a waterproof camera system.

Description of the Related Art

A waterproof camera system, which includes storing an image pickup apparatus like a digital camera in a dedicated waterproof casing, is used for underwater image pickup and above water image pickup. If the image pickup apparatus is communicable with another device (hereinafter referred to as an "external device") at that time, an image pickup operation, a setting operation of an image pickup condition, and live view display of a pickup image, in the image pickup apparatus, and reproduction of a pickup image can be performed by the external device.

Radio waves at frequencies used for wireless communications, such as 4G, 5G, and Wi-Fi®, cannot propagate underwater. Accordingly, Japanese patent No. 6478211 publication discloses a system that can operate a waterproof image pickup terminal under water by a smart phone above water by connecting the waterproof image pickup terminal and smart phone with, for example, a communication cable.

Since the technique disclosed in the above-mentioned publication assumes use of the waterproof image pickup terminal in a state being under water, it does not consider image pickup while the waterproof image pickup terminal floats on the water surface.

SUMMARY

Embodiments of the present disclosure provide a waterproof camera system that is capable of maintaining a wireless connection state with an external device while floating on the water surface.

According to embodiment of the present disclosure, a waterproof camera system including an image pickup apparatus equipped with a wireless module, a waterproof casing that hermetically stores the image pickup apparatus, and a float attached to the waterproof casing, wherein an antenna unit of the wireless module is arranged at either a position with a height approximately equal to a surface of water the waterproof system is located in or a position separated from the water surface in an above water direction in each of a first position where the waterproof camera system floats on the water surface so that the image pickup apparatus can perform underwater image pickup and a second position where the waterproof camera system floats on the water surface so that the image pickup apparatus can perform above water image pickup.

Further features will become apparent from the following description of exemplary embodiments with reference to the attached drawings.

DESCRIPTION OF THE EMBODIMENTS

Figure 1A:
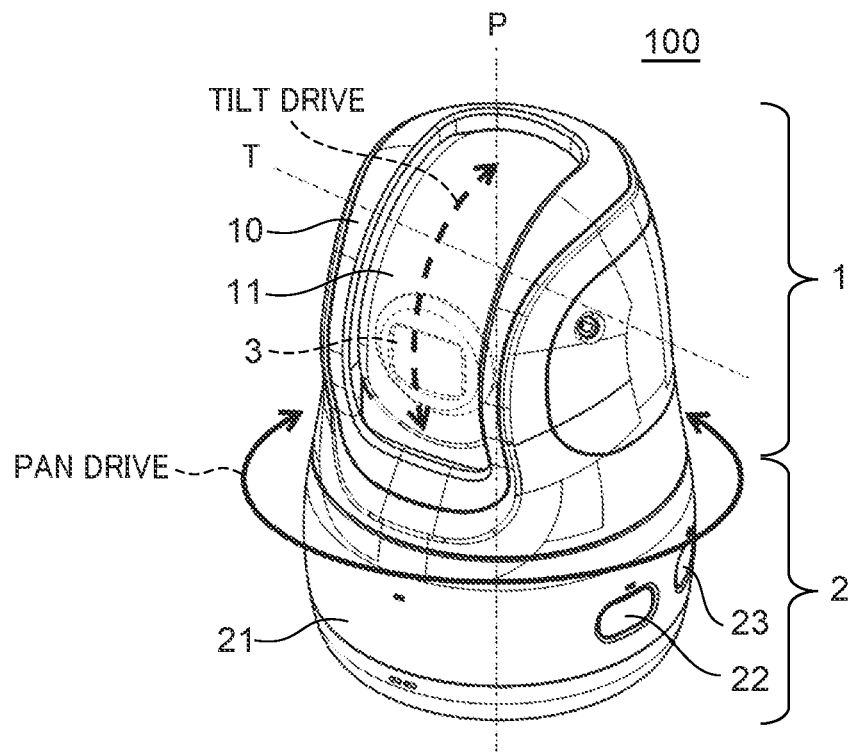
FIG. 1A and FIG. 1B are external perspective views illustrating a digital camera used for a waterproof camera system.

Hereafter, exemplary embodiments according to the present disclosure will be described in detail by referring to the drawings.

Figure 1B:
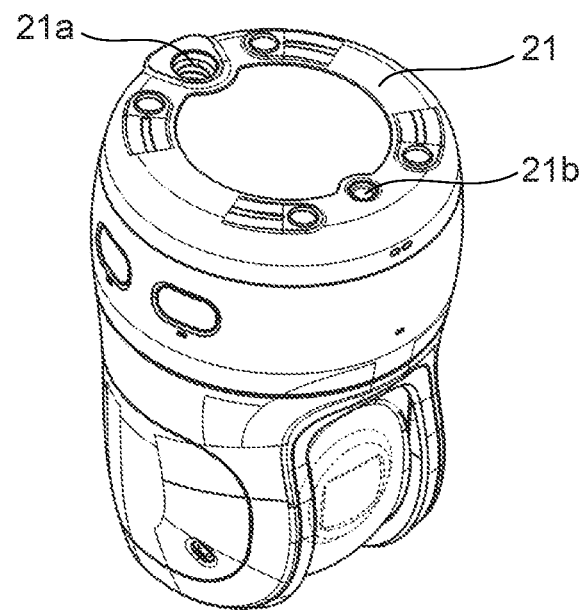

FIG. 1A and FIG. 1B are external perspective views illustrating a digital camera 100 as an example of an image pickup apparatus used for a waterproof camera system 1000 according to the present embodiment. Directions of viewing the digital camera 100 differ between FIG. 1A and FIG. 1B. The entire configuration of the waterproof camera system 1000 will be described by referring to FIG. 4, FIG. 5A, and FIG. 5B.

The digital camera 100 consists of a first housing 1 and a second housing 2. The second housing 2 becomes a base in a case where the digital camera 100 is used alone without storing into a waterproof casing 200 (see FIG. 2A), in a case where it is placed on a desk, for example. The first housing 1 is rotatably stored on the second housing 2 to enable pan drive (horizontal rotation) around a pan drive rotation axis P (a first axis) with respect to the second housing 2.

The first housing 1 has a top cover 10 as an exterior part. The top cover 10 has a dome component 11 that covers a front part and an upper part of the first housing 1 and is transparent. The dome component 11 is formed, for example, from high transparency resin material, such as polycarbonate resin or acrylic resin. In the present embodiment, the acrylic resin that has high transmittance for visible light is used.

Inside the dome component 11, a lens unit 3 indicated by a broken line is rotatably stored in the first housing 1 to enable tilt drive (vertical rotation) around a tilt drive rotation axis T (a second axis) that intersects perpendicularly with the pan drive rotation axis P.

The second housing 2 has a bottom cover 21 as an exterior part. A camera control substrate and a battery for driving the camera (not illustrated) and a wireless module 24 (see FIG. 5A) are arranged inside the bottom cover 21.

A power button 22 and a wireless communication button 23 are provided on a side surface of the bottom cover 21. In a bottom surface of the bottom cover 21, a fixing internal thread hole 21a to which a camera fixing external screw 204 (see FIG. 2B) of a waterproof casing 200 (see FIG. 2A) is fastened and a positioning hole 21b used for positioning to the waterproof casing 200 are provided.

The digital camera 100 can pick up images in various directions while moving the lens unit 3 by combining the pan drive and tilt drive, even if the digital camera 100 is arranged at a fixed point.

Figure 2A:
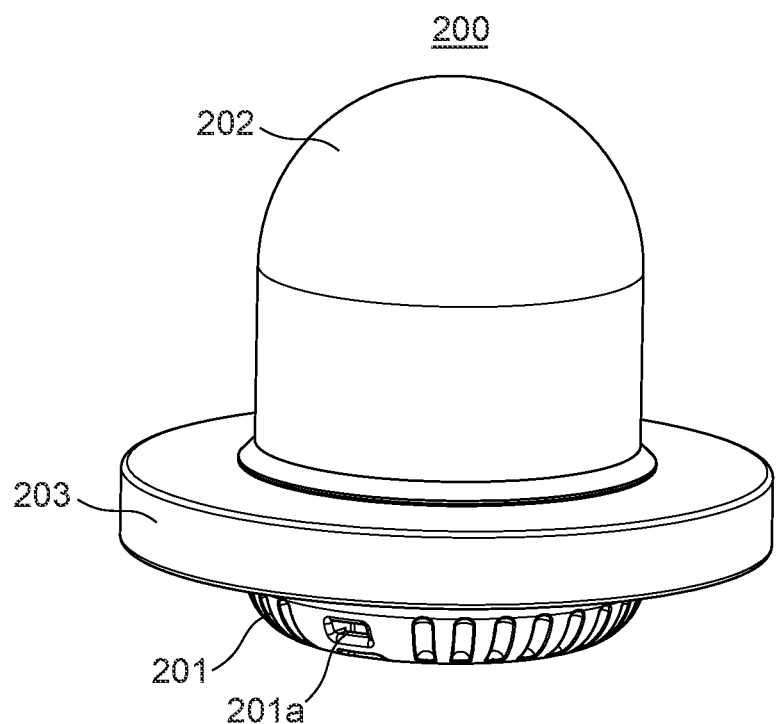
FIG. 2A and FIG. 2B are external perspective views illustrating a waterproof casing and a float used for the waterproof camera system.
Figure 2B:
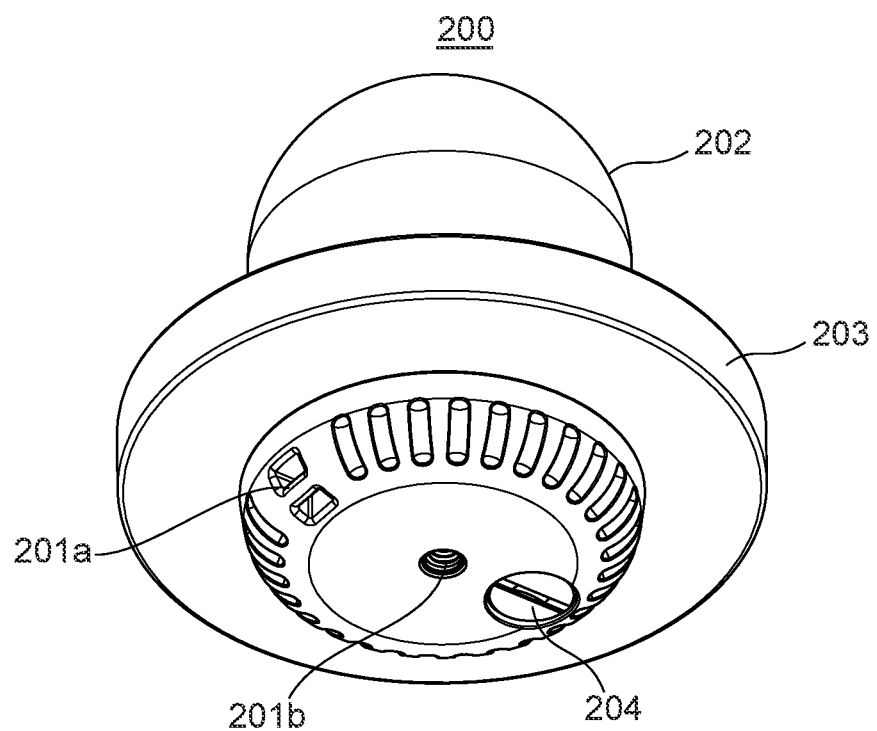

FIG. 2A and FIG. 2B are external perspective views illustrating a state where a float 203 is attached to the waterproof casing 200 used for the waterproof camera system 1000. Directions of viewing the waterproof casing 200 differ between FIG. 2A and FIG. 2B.

The waterproof casing 200 includes a bottom casing 201 (a first casing) and a top casing 202 (a second casing). The digital camera 100 is secured to the bottom casing 201. A strap string stopper 201a and a tripod internal thread hole 201b are provided in the bottom casing 201. The camera fixing external screw 204 can be attached to the bottom casing 201.

A strap string (not illustrated) can be attached to the strap string stopper 201a. The strap string works as a flow stopper of the waterproof camera system 1000 when the waterproof camera system 1000 is used while floating on a water surface. The tripod internal thread hole 201b is used to fix the waterproof casing 200 to a tripod mount (not illustrated).

A linear groove is formed in the camera fixing external screw 204 that is screwed to the fixing internal thread hole 21a to enable thread fastening with a coin etc. The top casing 202 is formed from polycarbonate resin that has a high transparency.

The float 203 is formed in a ring shape from expanded polystyrene etc. The float 203 generates buoyancy when placed in water and is attachable to the outside of the waterproof casing 200.

Figure 3:
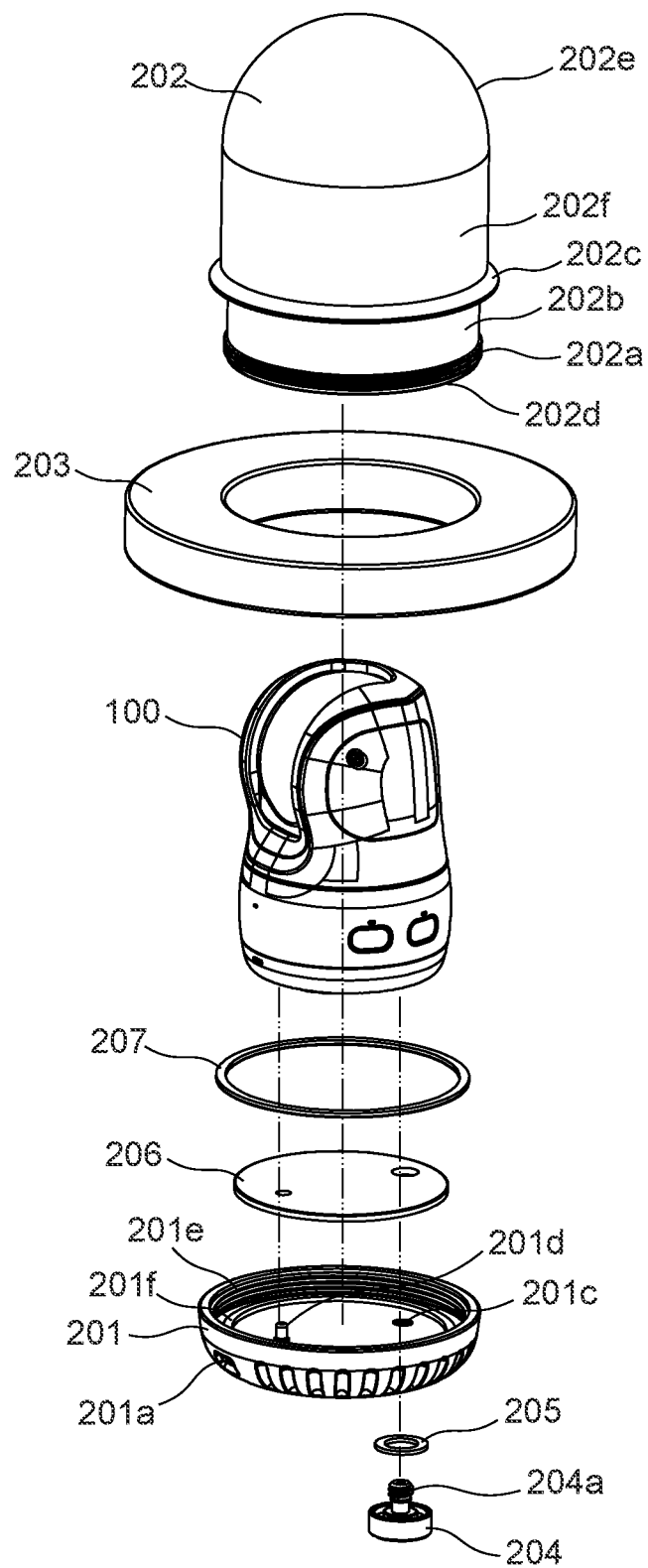
FIG. 3 is an exploded perspective view illustrating the waterproof camera system.

FIG. 3 is an exploded perspective view illustrating the waterproof camera system 1000 and illustrates a state where the waterproof casing 200 is dismantled. The digital camera 100 is secured to the bottom casing 201 of the waterproof casing 200 by the camera fixing external screw 204. Details of a positioning method and a fixing method between the digital camera 100 and the bottom casing 201 will be described below with respect to FIG. 4.

A rubber sheet 206 that absorbs impact and vibration from outside the waterproof casing 200 is arranged between the digital camera 100 and the bottom casing 201. The rubber sheet 206 reduces the impact and vibration applied to the digital camera 10. The rubber sheet 206 is a member with elasticity and is secured beforehand to the bottom casing 201 using, for example, a double-stick tape (not illustrated). It should be noted that the rubber sheet 206 can be secured using any type of adhesive.

An external thread 202a, a float installation part 202b, and a rib 202c are provided in the top casing 202 in this order from an open side. The external thread 202a is screwed to an internal thread 201e provided in the bottom casing 201. The float 203 is shaped so as to be embedded to the float installation part 202b.

The float 203 is embedded to the float installation part 202b, and the internal thread 201e of the bottom casing 201 is screwed to the external thread 202a of the top casing 202. This enables the top casing 202 and the bottom casing 201 joining together, and the float 203 is interposed between the rib 202c and the open end of the bottom casing 201 and is attached so as not to depart from the waterproof casing 200. That is, the float 203 is prevented from separating from the waterproof casing 200 by the rib 202c and the bottom casing (first casing) 201.

Leakage of water from the screwed part between the bottom casing 201 and the top casing 202 is prevented by an O-ring 207 formed from, for example, silicone rubber, etc. The O-ring 207 is secured to an O-ring secured part 201f of the bottom casing 201, and the leakage of water into the waterproof casing 200 is prevented because the O-ring is elastically compressed by an O-ring contact part 202d of the top casing 202.

Leakage of water from a hole 201c located in the bottom casing 201 is prevented by arranging an external thread seat surface sheet 205 formed by, for example, silicone rubber, etc., between the camera fixing external screw 204 and the bottom casing 201. This enables the digital camera 100 to be hermetically stored in the waterproof casing 200.

An internal thread is formed in the hole 201c of the bottom casing 201 so that the camera fixing external screw 204 can avoid easily dropping from the bottom casing 201 even in a state where the digital camera 100 is detached from the bottom casing 201.

Figure 4:
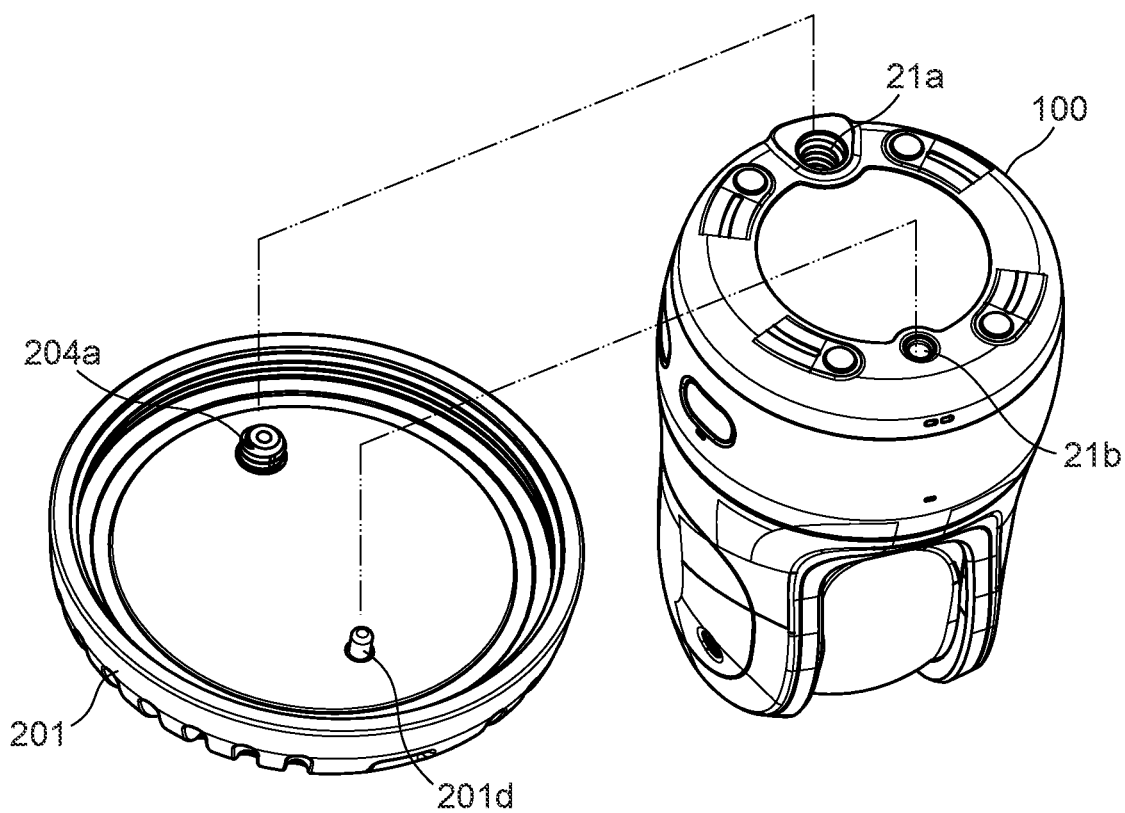
FIG. 4 is a perspective view illustrating a fixing method of the digital camera to the waterproof casing.

FIG. 4 is a perspective view illustrating a fixing method of the digital camera 100 to the bottom casing 201 of the waterproof casing 200. A positioning boss 201d of the bottom casing 201 is fitted into the positioning hole 21b of the digital camera 100, and the external thread 204a of the camera fixing external screw 204 is screwed to the fixing internal thread hole 21a of the digital camera 100.

This enables the digital camera 100 to be positioned to the bottom casing 201 of the waterproof casing 200 and is secured in contact with the bottom casing 201 via the rubber sheet 206. As a result, positional relationships between the components of the digital camera 100 and the components of the waterproof casing 200 are defined.

Figure 5A:
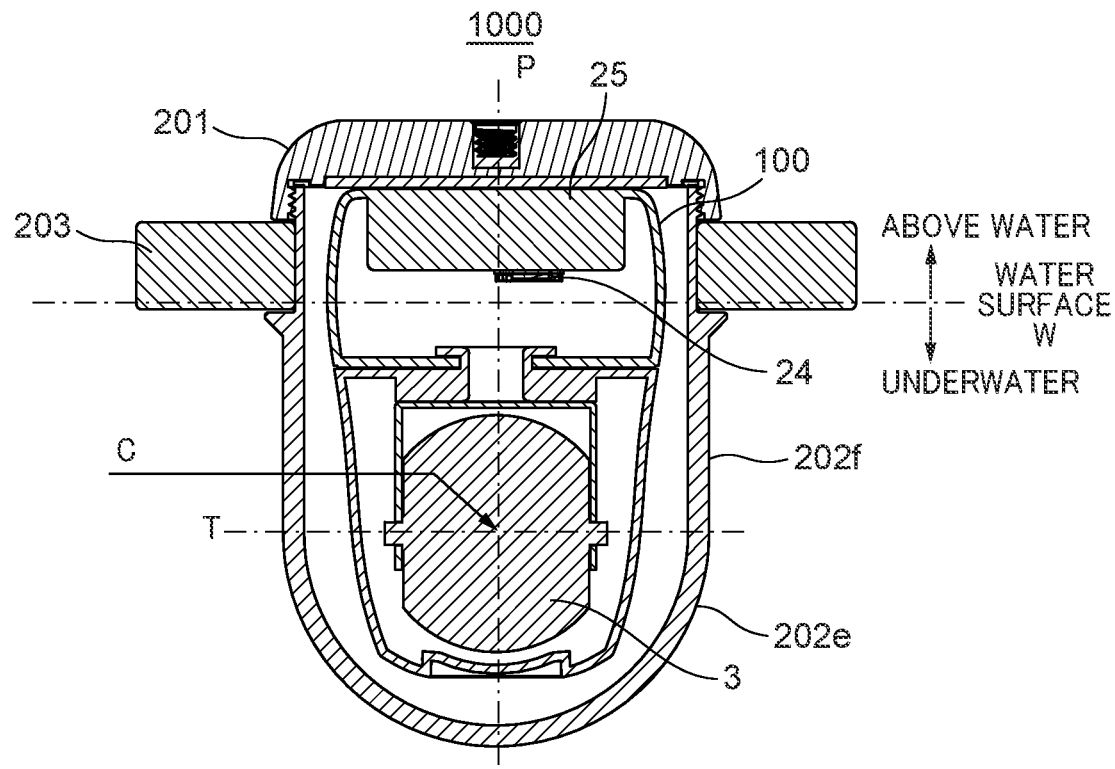
FIG. 5A and FIG. 5B are sectional views illustrating states where the waterproof camera system floats on a water surface.
Figure 5B:
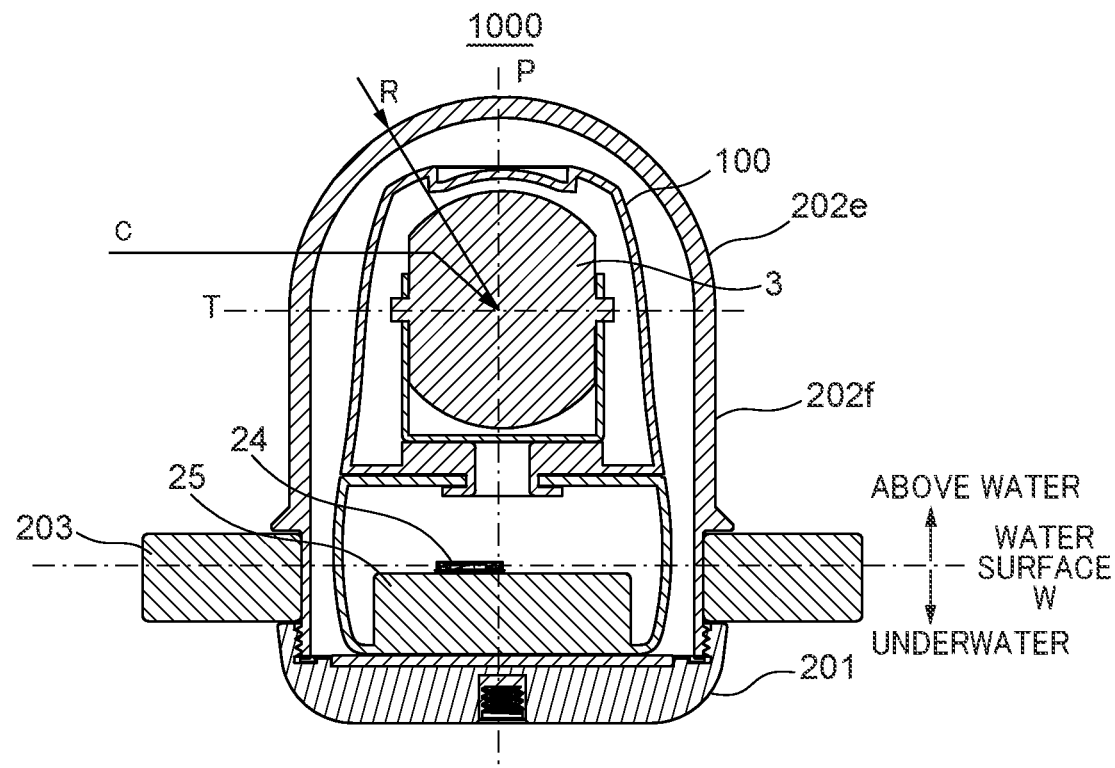

FIG. 5A and FIG. 5B are sectional views illustrating states where the waterproof camera system 1000 floats on a water surface. FIG. 5A illustrates a first position in performing underwater image pickup, while FIG. 5B illustrates a second position in performing above water image pickup. FIG. 5A and FIG. 5B illustrate the section of the waterproof camera system 1000 in a plane including the pan drive rotation axis P and the tilt drive rotation axis T of the digital camera 100. Illustrations of parts unnecessary to the following description are omitted in FIG. 5A and FIG. 5B.

Figure 6A:
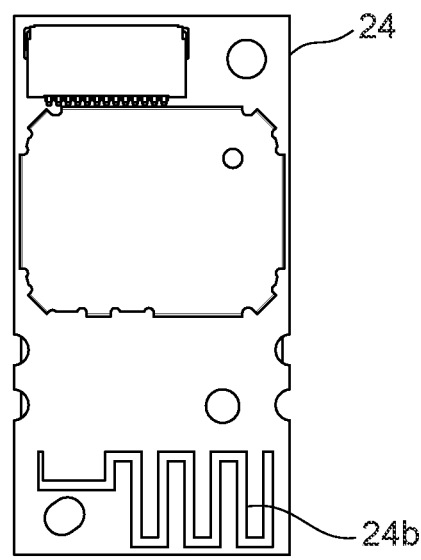
FIG. 6A and FIG. 6B are views illustrating a wireless module provided in the digital camera.
Figure 6B:
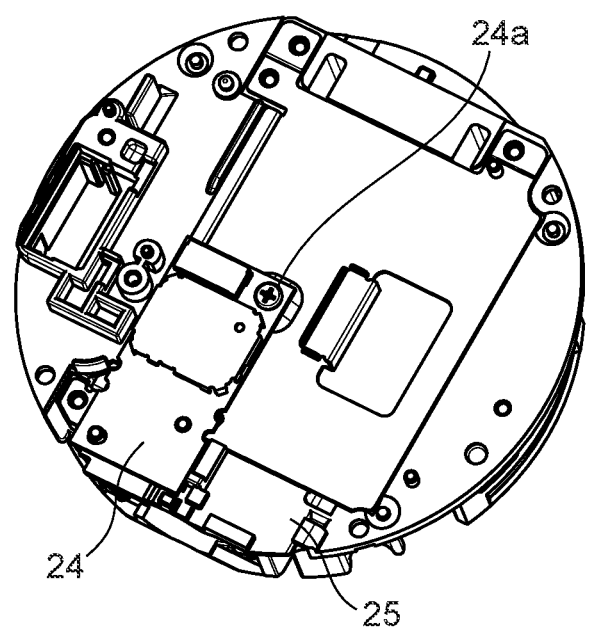

FIG. 6A is a front view of the wireless module 24 installed in the digital camera 100. FIG. 6B is a view illustrating a secured state of the wireless module 24 inside the digital camera 100. The wireless module 24 communicably connects the digital camera 100 to an external device, like a smart phone. As illustrated in FIG. 6A, the wireless module 24 has a structure where an antenna unit 24b is integrally provided in a circuit board on which electronic parts and electric parts, such as IC and a connector, are implemented. As illustrated in FIG. 6B, the wireless module 24 is secured to a battery chamber 25 with a screw 24a.

While the antenna integrated module of which the antenna unit 24b is integrated in the circuit board is used as the wireless module 24 in the present embodiment, this configuration is not limiting. The antenna unit 24b can be a separate entity from the circuit board.

The waterproof camera system 1000 is configured so that a part of the waterproof casing 200 floats on a water surface W with the buoyancy caused by the waterproof casing 200 and float 203 in both the positions of performing the underwater image pickup and performing the above water image pickup. The antenna unit 24b that transmits and receives a signal (radio wave) between the digital camera 100 and an external device (not illustrated) is arranged at a position where the height is approximately equal to the water surface W or a position separated from the water surface W in an above water direction for performing both the underwater image pickup and the above water image pickup. That is, the antenna unit 24b is arranged at a position that is not separated from the water surface W in an underwater direction.

The above configuration reduces disconnection because of water of the communication between the digital camera 100 and the external device. As a result, an image pickup operation, a setting operation of an image pickup condition, and live view display of a pickup image, in the digital camera 100, and reproduction of a pickup image stored in the digital camera 100 can be performed by the external device in a stress free state.

If the float 203 is not attached, the waterproof casing 200 that contains the digital camera 100 cannot keep a stable floating state on the water surface in the position illustrated in FIG. 5A or FIG. 5B. When the float 203 is attached to the waterproof casing 200, the waterproof camera system 1000 stably floats so that the tilt drive rotation axis T of the digital camera 100 will be approximately parallel to the water surface.

The buoyancy of the float 203 is adjusted so that the position of the water surface W can fall within the range of the thickness of the float 203, while the waterproof camera system 1000 floats on the water surface in either performance of the underwater image pickup or performance of the above water image pickup.

As described above, the digital camera 100 can pick up an image in a wide range by combining the tilt drive and pan drive of the lens unit 3. The shape of the float 203 is preferably designed so as not to be included in an image pickup area obtained by the tilt drive and pan drive of the lens unit 3.

The waterproof camera system 1000 is designed so that the antenna unit 24b of the wireless module 24 can fall within the range of the thickness of the float 203 in performing either the underwater image pickup or above water image pickup. In other words, the waterproof camera system 1000 is designed so that the antenna unit 24b can overlap with the float 203 when viewed in a direction parallel to the water surface W. This inhibits the float 203 from obstructing the wireless communication of the antenna unit 24b, which stabilizes the wireless communication connection with an external device.

The top casing 202 of the waterproof casing 200 has a hemispherical part 202e of a radius R centering a point C that coincides approximately with the intersection of the pan drive rotation axis P and tilt drive rotation axis T. In addition, the point C is located on the image-pickup optical axis line of the lens unit 3. This inhibits generation of distortion in an image caused by the top casing 202 even when the lens unit is tilt-driven or pan-driven.

The waterproof casing 200 has a cylindrical part 202f formed adjacent to the hemispherical part 202e. The top casing 202 is formed so that the cylindrical part 202f is formed adjacent to the hemispherical part 202e so that the top casing 202 eliminates an undercut in consideration of an extracting direction of a mold when the inner shape of the top casing 202 is formed by resin mold.

As described above, in the waterproof camera system of the present embodiment, the antenna unit 24b is arranged at a position near the water surface W or a position separated from the water surface W in the above water direction in performing both the underwater image pickup and the above water image pickup. Thus, the wireless communication between the digital camera 100 and an external device is stabilized, and a user can operate the digital camera 100 by the external device in a stress free state.

While the present disclosure has been described in detail based on the above-described embodiment(s), the present disclosure is not limited to these specific embodiments, and various configurations that do not deviate from the scope of the present disclosure are also included in the present disclosure.

For example, in the above-described embodiment, the waterproof camera system includes storing the digital camera that has the lens unit that enables the pan drive and tilt drive into the waterproof casing.

However, a digital camera that can be stored in the waterproof casing is not restricted to the above-mentioned configuration. In another exemplary embodiment, a digital camera with a lens unit that is not tilt-driven and pan-driven is employed. In another exemplary embodiment, an image pickup apparatus that can be stored in the waterproof casing is not restricted to a digital camera, and can be an electronic apparatus, such as a video camera or a smart phone, that is provided with an image pick-up function (an image sensor).

OTHER EMBODIMENTS

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-023859, filed Feb. 18, 2022, which is hereby incorporated by reference herein in its entirety.

What is claimed is:

1. A waterproof camera system comprising:
   an image pickup apparatus equipped with a wireless module;
   a waterproof casing that hermetically stores the image pickup apparatus; and
   a float attached to the waterproof casing,
   wherein an antenna unit of the wireless module is arranged at either a position with a height approximately equal to a surface of water the waterproof camera system is located in or a position separated from the water surface in an above water direction in each of a first position where the waterproof camera system floats on the water surface so that the image pickup apparatus can perform underwater image pickup and a second position where the waterproof camera system floats on the water surface so that the image pickup apparatus can perform above water image pickup, and
   the second position is a position in which the waterproof camera system is vertically inverted relative to the first position.

2. The waterproof camera system according to claim 1, wherein the antenna unit overlaps with the float when viewed in a direction parallel to the water surface in both the first position and the second position.

3. The waterproof camera system according to claim 1, wherein the wireless module has a circuit board in which electronic parts are implemented, and
   wherein the antenna unit is integrally provided in the circuit board.

4. The waterproof camera system according to claim 1, wherein the waterproof casing has a hemispherical part, and
   wherein a center of the hemispherical part is located on an image-pickup optical axis line of the image pickup apparatus.

5. The waterproof camera system according to claim 4, wherein the image pickup apparatus comprises:
   a lens unit;
   a first housing holding the lens unit; and
   a second housing that holds the first housing rotatably around a first axis and is secured to the waterproof casing,
   wherein the first housing holds the lens unit rotatably around a second axis that intersects perpendicularly with the first axis, and wherein the center of the hemispherical part coincides approximately with an intersection of the first axis and the second axis.

6. The waterproof camera system according to claim 5, wherein the float is shaped to not be included in an image pickup area obtained by rotating the lens unit around the first axis and the second axis, respectively.

7. The waterproof camera system according to claim 4, wherein the waterproof casing comprises:
   a first casing to which the image pickup apparatus is secured; and
   a second casing that has the hemispherical part and is secured to the first casing,
   wherein the second casing comprises:
      a rib; and
      a float installation part to which the float is attached,
   wherein the float is prevented from separating from the waterproof casing by the rib and the first casing.

8. The waterproof camera system according to claim 1, wherein the position of the water surface falls within the range of the thickness of the float in the first position or the second posture.

* * * * *